US012617095B1

(12) United States Patent
McClosky et al.

(10) Patent No.: US 12,617,095 B1
(45) Date of Patent: May 5, 2026

(54) DYNAMIC ALLOCATION OF ROBOTIC SORTATION RESOURCES

(71) Applicant: Amazon Technologies, Inc., Seattle, WA (US)

(72) Inventors: Benjamin McClosky, Woodinville, WA (US); Di Wang, Lexington, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 670 days.

(21) Appl. No.: 18/078,307

(22) Filed: Dec. 9, 2022

(51) Int. Cl.
| | |
|---|---|
| *B25J 9/16* | (2006.01) |
| *B07C 3/02* | (2006.01) |
| *B65B 35/16* | (2006.01) |
| *B65B 57/06* | (2006.01) |

(52) U.S. Cl.
CPC .............. *B25J 9/1682* (2013.01); *B07C 3/02* (2013.01); *B65B 35/16* (2013.01); *B65B 57/06* (2013.01)

(58) Field of Classification Search
CPC .......... B25J 9/1682; B07C 3/02; B65B 35/16; B65B 57/06
See application file for complete search history.

(56) References Cited

U.S. PATENT DOCUMENTS

| | | | |
|---|---|---|---|
| 11,590,659 B2 * | 2/2023 | Peterson ................. | B07C 5/362 |
| 2023/0382645 A1 * | 11/2023 | Lan ...................... | B65G 1/1378 |

* cited by examiner

*Primary Examiner* — Jacob S. Scott
*Assistant Examiner* — Miraj T. Patel
(74) *Attorney, Agent, or Firm* — K&L Gates LLP

(57) ABSTRACT

In various examples, systems and methods of controlling robotic sortation devices are described. In various examples, a first item associated with a first target may be determined. A first item count associated with a first buffer may be determined. A first robotic sortation device may be allocated to the first target based at least in part on the first item count. The first robotic sortation device may receive the first item. The first robotic sortation device may be controlled to place the first item in a first container associated with the first target.

20 Claims, 10 Drawing Sheets

700

710 Determining a first item associated with a first target

720 Determining a first item count associated with a first buffer, the first buffer storing items prior to loading the items onto robotic drives 730 Determining a second item count associated with items loaded onto robotic drives 740 Determining a first number of robotic sortation devices allocated to the first target 750 Allocating an additional robotic sortation device to the first target based on the first item count, the second item count, and the first number of robotic sortation devices allocated to the first target 760 Loading the first item onto a first robotic drive 770 Sending first control instructions to the first robotic drive to cause the first robotic drive to take the first item to the additional robotic sortation device 780 Determining, by the additional robotic sortation device using computer vision, that the first item is associated with the first target 790 Controlling the additional robotic sortation device to place the first item in a first container associated with the first target based on the allocation of the additional robotic sortation device to the first target

700

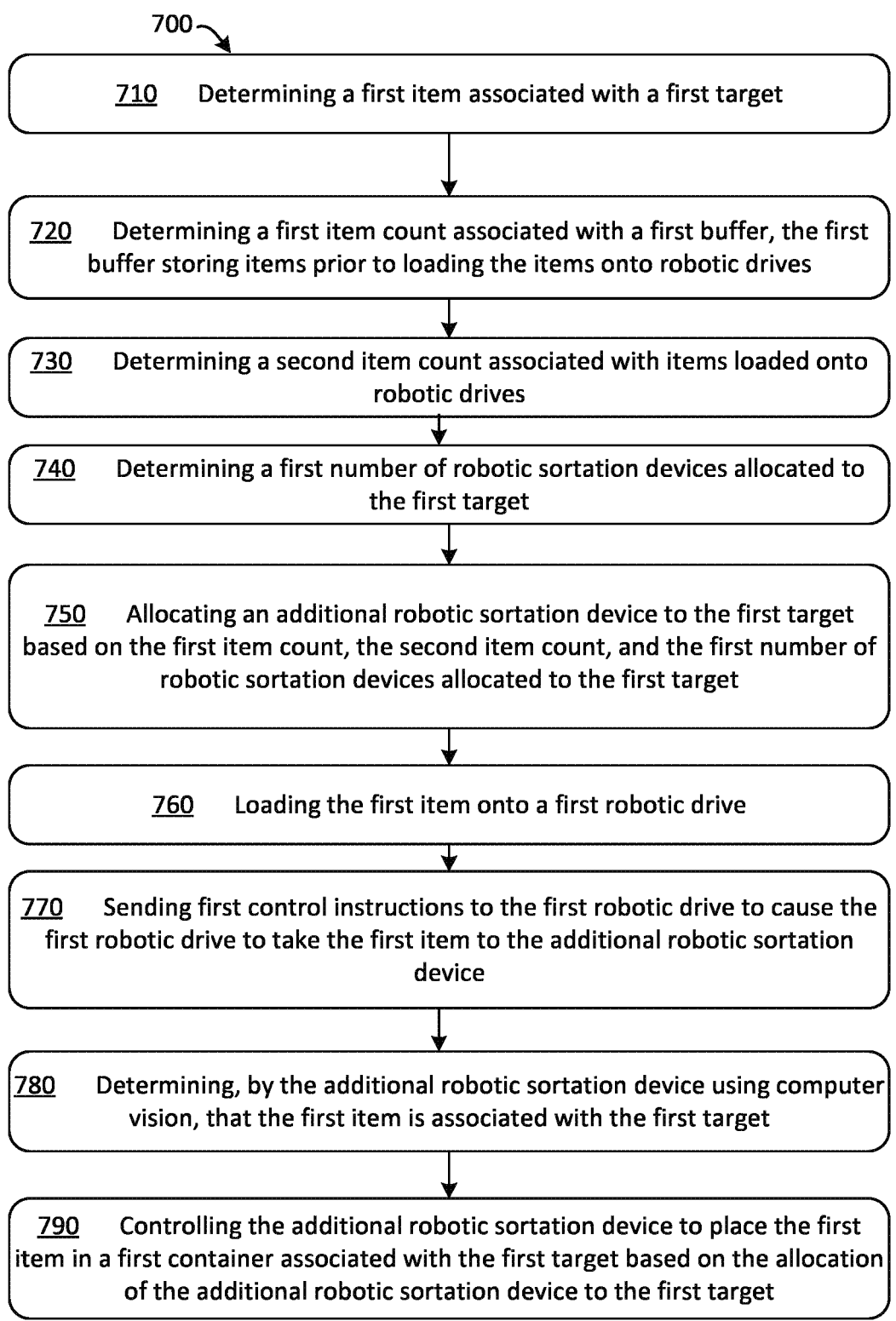

710    Determining a first item associated with a first target

720    Determining a first item count associated with a first buffer, the first buffer storing items prior to loading the items onto robotic drives

730    Determining a second item count associated with items loaded onto robotic drives

740    Determining a first number of robotic sortation devices allocated to the first target

750    Allocating an additional robotic sortation device to the first target based on the first item count, the second item count, and the first number of robotic sortation devices allocated to the first target

760    Loading the first item onto a first robotic drive

770    Sending first control instructions to the first robotic drive to cause the first robotic drive to take the first item to the additional robotic sortation device

780    Determining, by the additional robotic sortation device using computer vision, that the first item is associated with the first target

790    Controlling the additional robotic sortation device to place the first item in a first container associated with the first target based on the allocation of the additional robotic sortation device to the first target

FIG. 7

DYNAMIC ALLOCATION OF ROBOTIC SORTATION RESOURCES

BACKGROUND

Robotic drive systems can be used to move items and/or containers of items from one location to another. Robotic arms can be used to sort items by removing an item from one location and placing the item in a different, target location. Systems of such robots can be designed and deployed to provide desired tasks such as item processing and sortation.

BRIEF DESCRIPTION OF DRAWINGS

FIG. 7 is a flowchart describing an example process for dynamic allocation of robotic sortation resources, according to various aspects of the present disclosure.

DETAILED DESCRIPTION

Figure 1:
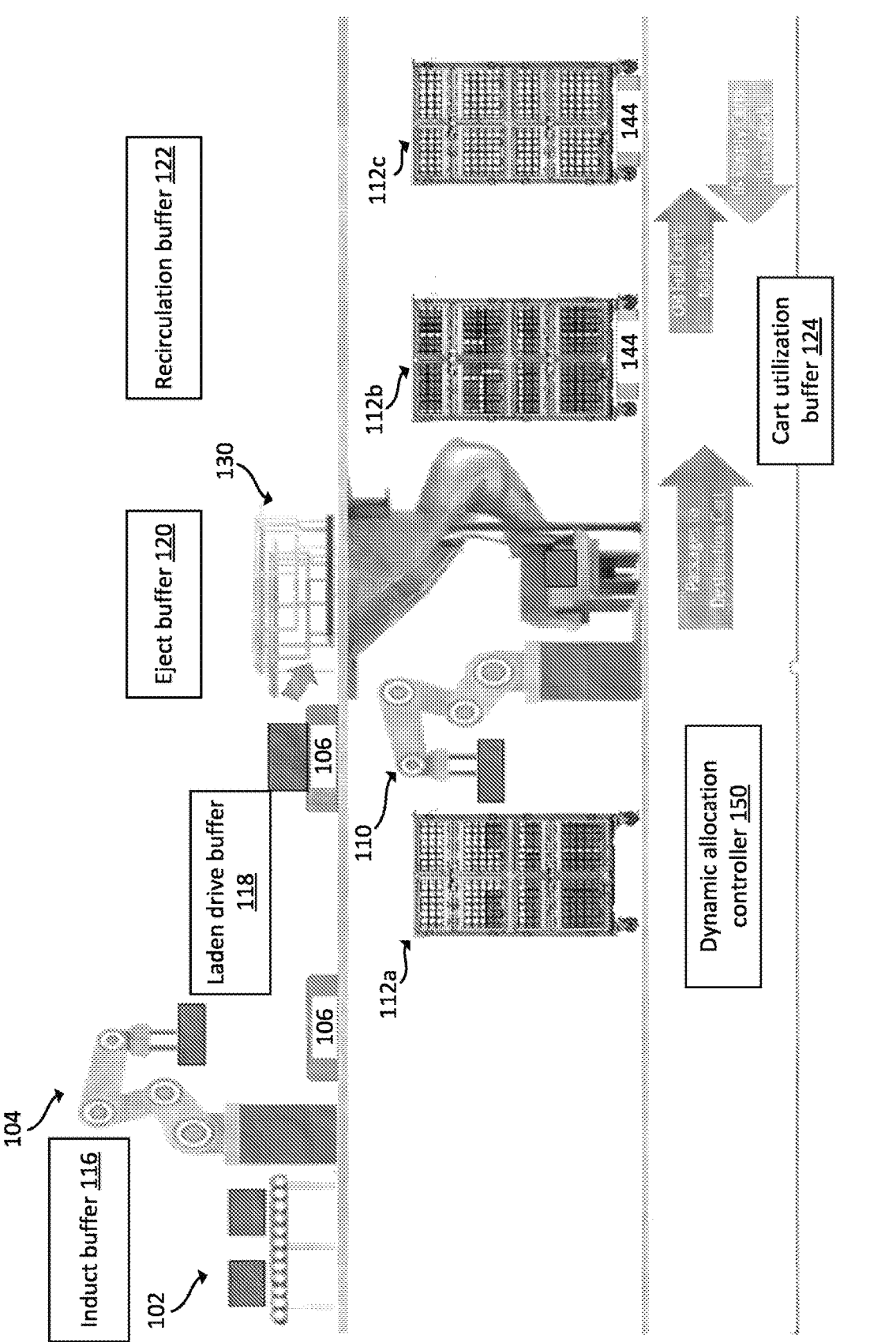
FIG. 1 is a diagram of an example robotic sortation system, according to various aspects of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, robotic sortation systems may be used in large scale sorting environments in which a large number of items are received, processed, sorted, and sent out. For example, large-scale delivery and inventory management systems may use fulfillment centers and other large warehouses that may serve as part of the supply chain and can serve as a hub for logistics and processes used to get items from third party sellers to the purchaser. In some cases, after items in such facilities are packaged and addressed for delivery, the packages are sorted into carts and/or other containers, with the packages in a single container being destined for the same delivery location. In some examples, such containers may be said to be "destination pure" as all items within the container may be destined for the same downstream location (whether such location is an intermediate location, such as a warehouse or last-mile delivery center, or the terminal location (e.g., a delivery address of a purchaser)). It should be noted that sortation may be used in other contexts beyond commercial delivery systems and in general may be used whenever heterogeneous items are to be sorted along some dimension of sortation (e.g., type, class, size, delivery destination, color, functionality, etc.). Accordingly, although many of the examples described herein use a package delivery example, the various dynamic allocation techniques used to control robotic resources may instead be deployed in other sortation contexts.

A robotic sortation system is described herein in which a highly-variable stream of inbound packages (or other items) may be processed, transported from induct stations to eject stations by laden drive robots, and then sorted at the eject stations by robotic sortation devices (e.g., robotic "arms") into destination pure containers. The number of physical containers that may be stationed at a robotic sortation device station may be limited due to spatial constraints (e.g., by physical constraints and/or by a reach of a stationary robotic arm). Since each such container is intended to be destination pure such that all items are bound for the same downstream location, the robotic arm is controlled to place packages that are bound for the same location in the same target container. Additionally, the laden drive robot devices are also controlled to provide packages to eject stations with containers that correspond to a target location for that package (e.g., where a robotic sortation device is sorting packages into a container bound for the target).

Systems and techniques are described herein for a dynamic allocation controller that dynamically allocates robotic sortation resources according to fluctuations in state variables representative of the current load of the system. This dynamic allocation controller can allocate and deallocate robotic sortation resources to account for surges and/or lulls in packages bound for particular target destinations and can optimize robot utilization to minimize periods of downtime for robotic sortation resources. Additionally, the dynamic allocation controller offers surge protection to prevent a particular surge in items from overwhelming surge protection buffers of the system (typically referred to herein as a "recirculation buffer") to prevent system lock-up. In large scale item delivery and sortation systems such as those in which the robotic sortation devices described herein are deployed, selection of items from storage locations, packaging of items in shipment boxes (as well as labeling the box and otherwise preparing the box for shipment), and then sorting the boxes for delivery to a wide variety of locations may be a highly complex, large-scale system. Signals indicating system load prior to a particular item being packaged, addressed (labeled), and/or otherwise prepared for shipment are noisy and do not lead to efficient robotic resource deployment when used alone to forecast robotic sortation resource deployment. Accordingly, the dynamic allocation controller described herein uses a variety of system load indicators from various sources to forecast package volume bound for different destinations and to efficiently allocate robotic resource development to ensure overall sortation system health and utilization. As may be apparent from FIGS. 2, 4A and the various descriptions herein, the facilities in which the dynamic allocation controllers may be deployed may sort thousands of heterogeneous packages per hour with packages being bound to a large number of different destinations. Efficiently allocating robotic resources based on forecasted and/or reactive need is a challenging endeavor in such environments.

The dynamic allocation controller allocates robotic sortation devices in a spatially-aware manner to ensure that robotic sortation devices servicing a particular target are spaced around the facility such that the distance that a given laden robotic drive travels in order to provide a package to a robotic sortation device allocated for the target is kept to a minimum. Additionally, the fullness (e.g., percentage utilization) of the destination pure containers into which the robotic sortation devices place items (packages) is monitored by the dynamic allocation controller to prevent deallocation of robotic sortation devices when the occupancy of a particular container is below a threshold. The dynamic allocation controller is able to operate in a reactive mode in which allocation/deallocation of robotic sortation devices is performed in response to the current capacity of a recirculating buffer (e.g., a surge protection package buffer). Additionally, as described in further detail below, the dynamic allocation controller may operate in a predictive mode in which various system level buffers are evaluated in order to predictively allocate and deallocate robotic resources based on a more holistic view of the system. Buffers, as used herein, refer to storage systems whether mobile (e.g., robotically controlled, conveyor systems, totes, carts, etc.) or stationary (e.g., shelving) where objects may be stored as they await further processing. Buffer levels may be monitored using radio frequency identifier (RFID) tags and readers, computer vision, code scanning, and/or other computer-based systems such that the number of items and/or packages in a particular buffer at a given time may be known. Accordingly, buffer level data may be consumable by other systems, such as the dynamic allocation controllers described herein in order to forecast and dynamically assign robotic and/or other resources. In addition, in some examples, additional data may be known about one or more of the objects in buffers. For example, after package labeling, the target destination for each package in a post-labeling buffer may be known. Accordingly, the number of packages bound for destination A in a buffer may be known and distinguished from the number of packages bound for destination B in the same buffer, and so on. Such data may also be used for dynamic resource allocation, as described in further detail below. Additional signals may also be used as described in further detail below. As an example, the current assignment of a robotic sortation device (e.g., a robotic arm) to a particular destination or set of destinations may be known and represented as data ingestible by the dynamic allocation controller in order to allocate robotic resources according to need/forecasted need and/or in order to deallocate robotic resources.

The dynamic allocation controllers described herein are able to dynamically allocate robotic resources based on current buffer levels and/or current allocations without creating interdependencies with other systems. For example, the logic employed by the dynamic allocation controller operates using only buffer counts from the various sortation facility buffers and based on current resource allocation information without sharing logic with other systems of the facility. Accordingly, the dynamic allocation controllers may be easily integrated and deployed in large scale systems independent of other systems being employed without causing complex dependencies that need to be updated and maintained over time.

Machine learning techniques, such as those described herein, are often used to form predictions, solve problems, recognize objects in image data for classification, etc. For example, computer vision techniques may be used to detect the target for a given item based on an address and/or code printed on a label of a package. Additionally, computer vision may be used to locate and pick up packages by robotic sortation devices in order to move the packages from one location to another and/or otherwise manipulate the objects. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram of an example robotic sortation system that are part of a sortation facility, according to various aspects of the present disclosure. In the example of FIG. 1 single (or limited) instances of various buffers and robotic resources are shown for illustrative purposes; however, it should be noted that an actual sortation facility may include multiple such instances (e.g., tens, hundreds, or thousands), as further described below. In the example depicted in FIG. 1, items may have previously been packaged and/or labeled (e.g., labeled with destination labels that indicate a target destination for the individual labeled packages) and may be placed on an induct buffer 116. An induct buffer 116 may store packages until such packages are picked up by robotic sortation device 104 and placed onto a laden robotic drive 106. The induct buffer 116 may be a conveyor-based system. In various examples, sensors (e.g., cameras and/or other sensors) may be associated with the induct buffer 116 such that induct buffer level (e.g., data tracking the number of packages bound for each target destination which are in the induct buffer at a given time) may be tracked. The sensors may scan package labels, for example, to determine the packages in the induct buffer 116 and the destination of the packages (e.g., by scanning a shipping label such as a QR code).

Individual packages 102 may be picked by the robotic sortation device 104 from induct buffer 116 and placed on a laden robotic drive 106. The target destination of the package may be known (e.g., as the packages are scanned while in the induct buffer 116 and/or another upstream process)

and transmitted wirelessly to the laden robotic drive 106. Scanning may refer to infrared barcode scanning and/or other computer-vision based scanning techniques. The laden robotic drive 106 may be instructed by a control system (e.g., dynamic allocation controller 150 or another controller system) to take the package to an eject station 130 that is associated with a robotic sortation device 110 that has been allocated by the dynamic allocation controller 150 to the target destination. For example, each of the storage units 112*a*, 112*b*, 112*c*, may be individually destination pure such that all packages sorted into a single storage unit are bound to the same destination. Accordingly, the dynamic allocation controller 150 may allocate the robotic sortation devices 110 to one or more specific target destinations. In an example, the station at which the robotic sortation device 110 is positioned may be able to accommodate four storage units (such as storage units 112*a*, 112*b*, 112*c*). In such an example, the robotic sortation device 110 may be allocated to up to four different target destinations. In a different example, multiple storage units at a given robotic sortation device 110 station may be assigned to the same destination, depending on the current allocation by the dynamic allocation controller 150. As described in further detail below, the robotic sortation devices 110 may be dynamically allocated to different target destinations based on various buffer levels according to the current and/or anticipated need (e.g., based on package volume to different target destinations). Within a sortation facility, there may be a large number of robotic sortation devices 110 and eject stations 130 (e.g., hundreds). The laden robotic drives 106 receive instructions as to which eject station 130 to take a given package to, based on the eject station 130 that has a robotic sortation device 110 that has been assigned to the target destination of the package. There may be multiple such eject stations 130 that have robotic sortation devices 110 that have been assigned to the target destination of a package carried by a laden robotic drive 106. In such examples, the laden robotic drive 106 may be instructed to take the package to the nearest eject station 130 to the induct buffer 116 from which the laden robotic drive 106 received the package. In other examples, the laden robotic drive 106 may be instructed to take the package to the eject station 130 assigned to the target destination based on the relative buffer levels of the different eject buffers 120. In still other examples, the laden robotic drive 106 may be instructed to take the package to the eject station 130 to which the laden robotic drive 106 is predicted to be able to navigate to in the shortest amount of time (among eject stations associated with the target destination) based on current traffic/congestion levels of the laden robotic drives 106.

The laden drive buffer 118 refers to the number of packages that are currently loaded onto laden robotic drives 106. The laden robotic drives 106 may receive instructions to take the package on a mezzanine (or on a single floor depending on the sortation facility) to an eject station that is associated with a robotic sortation device 110 that has been allocated to the target destination of the package. The eject buffer 120 may be a conveyor based system that receives the packages from laden robotic drives 106 and sends the packages to a lower level of the sortation facility (e.g., via a slide in the example depicted in FIG. 1) where a robotic sortation device 110 (e.g., a robotic arm) is stationed. Accordingly, the sortation facility in the example of FIG. 1 is a multi-tiered facility with a mezzanine and a lower level. However, in other examples, the processes shown and described may occur on a single level, depending on the facility. The robotic sortation device 110 includes sensors (e.g., cameras, depth sensors, and/or other computer vision sensors) effective to scan a package and determine its target location. The robotic sortation device 110 picks up the package, determines the target destination (e.g., via a label), and places the package into the storage unit 112*a*, 112*b*, or 112*c* that is associated with the target destination. Since the laden robotic drive 106 has been instructed to take the package to the eject station 130 that is associated with the target destination and since the robotic sortation device 110 is currently allocated to that target destination, there should be at least one storage unit 112*a*, 112*b*, 112*c* (etc.) within reach of the robotic sortation device 110 that is allocated for the target destination.

The eject buffer 120 includes sensors to monitor the number of packages that are awaiting sortation by the robotic sortation device 110. As the packages have already been labeled, the various buffers (including the induct buffer 116, the laden drive buffer 118, the eject buffer 120, the recirculation buffer 122, and the cart utilization buffer 124) may store the per-destination count of packages stored in each of the buffers and may send this information (e.g., using any desired communication protocol) to the dynamic allocation controller (e.g., over a computer communication network). Accordingly, the eject buffer 120 may monitor the number of packages stored in the eject buffer 120 per-destination.

The cart utilization buffer 124 may store, for each storage unit (e.g., storage units 112*a*, 112*b*, 112*c*, etc.) that has been positioned at a station with a robotic sortation device 110 (sometimes referred to as a container build station), the package count and/or percentage fullness of each of the storage units. The cart utilization buffer 124 may use cameras, depth sensors, etc., to monitor the number of packages bound to a particular destination that are in a given storage unit. In various examples, the cart utilization buffer 124 may be tracked according to the data tracked by the robotic sortation device 110 in terms of the number and/or class (e.g., size) of packages placed into the storage unit.

Since the storage units are destination pure, all packages in a particular storage unit are destined for the same target destination. The cart utilization buffer 124 represents, on a per-storage unit basis, the relative "fullness" of that storage unit. Since the storage units and/or the packages placed therein may be of known sizes, the relative fullness of the storage units may be determined. Once a particular storage unit has reached a desired threshold utilization (e.g., "fullness" such as measured by a threshold percentage utilization) and/or once the storage unit has been otherwise closed out for removal from the container build station (e.g., due to a time schedule), the storage unit may be removed via a robotic drive 144. Once emptied by a downstream process, an empty storage unit may be returned via a robotic drive 144 to a container build station. In the example shown in FIG. 1, storage unit 112*b* is full and has been closed out. Accordingly, a robotic drive 144 removes the storage unit 112*b* from the container build station. An empty storage unit 112*c* is returned to the container build station via the robotic drive 144.

As previously described multiple target destinations may be allocated to a given robotic sortation device 110 at a container build station at a given time. Accordingly, the robotic sortation device 110 places a package bound for target destination A into a storage unit that has been allocated for target destination A and places a package bound for target destination B into a storage unit that has been allocated for target destination B, and so on. The dynamic allocation controller 150 may determine, based on the various buffer levels, that target destination B should be deallocated from the robotic sortation device 110 and that the available capacity should instead by allocated to target destination C. The dynamic allocation controller 150 may send control instructions to a robotic drive 144 to remove the container (e.g., cart) associated with target destination B. Additionally, the dynamic allocation controller 150 may send control instructions to a different robotic drive 144 to bring an empty cart (e.g., a new container allocated to target destination C) to the robotic sortation device 110.

For example, various buffer levels may indicate a relatively low number of packages bound for target destination B and an increase in the number of packages bound for target destination C. Accordingly, control instructions may be sent to the robotic sortation device 110 to place packages associated with target destination C into a mobile storage unit that is associated with target destination C. In addition, the eject station 130 that is associated with the robotic sortation device 110 may be updated with data indicating that it is associated with target destination C. Accordingly, laden robotic drives 106 carrying packages bound for target destination C may now be controlled to take such packages to the eject station 130.

As described in further detail below, there may be multiple induct stations and multiple eject stations. A given eject station may be associated with a container build station including a robotic sortation device 110. The various buffers described above may provide overflow protection for the induct stations, eject stations, and container build stations. Additionally, in order to provide surge protection and to prevent the various buffers from overflowing, a recirculation buffer 122 may be provided that stores overflow items from other buffers/systems. Packages may be placed in the recirculation buffer 122 when a particular buffer has reached a threshold number of packages and/or is otherwise determined to be in danger of being overloaded or is unavailable. For example, if there is no laden robotic drive 106 to accept a particular package, the package may be placed in the recirculation buffer 122 in order to prevent packages from building up in the induct buffer 116 and causing a problem due to package accumulation in the induct buffer 116. Similarly, if packages are backed up in the eject buffer 120 (e.g., packages are backed up to the top of the slide shown in FIG. 1) a package may be placed in the recirculation buffer 122 by the laden drive buffer 118 instead of causing an overflow in the eject buffer 120.

The dynamic allocation controller 150 may receive data indicating the buffer levels from the various buffers including induct buffer 116, eject buffer 120, recirculation buffer 122, laden drive buffer 118, cart utilization buffers 124 (for specific storage units 112a, 112b, 112c). The dynamic allocation controller 150 may send control instructions to the robotic sortation devices 110 to allocate the robotic sortation devices 110 to different target destinations such that the robotic sortation devices 110 sort packages of the allocated target destination into the same storage unit. Additionally, the newly-allocated target destination may be associated with the eject station 130 for the allocated robotic sortation devices 110. The laden robotic drives 106 may be sent control instructions by the dynamic allocation controller 150 to send the laden robotic drives 106 to eject stations that are currently allocated to the target destination of the package carried by the particular laden robotic drive 106. Similarly, when packages surges have subsided and/or the number of packages associated with a target destination have diminished, the various robotic resources may be de-allocated so that they can be allocated to different target destinations according to current need/package volume. Various examples of the computer-implemented logic and/or techniques used by the dynamic allocation controller 150 to dynamically allocate the robotic sortation devices 110 are discussed in further detail below.

The dynamic allocation controller 150 may be implemented by one or more computing devices which may include non-transitory computer-readable memory and/or may be configured in communication with non-transitory computer-readable memory, such as over network. In some examples, the non-transitory computer-readable memory may store instructions that, when executed by at least one processor of the dynamic allocation controller 150, may be effective to perform one or more of the various techniques described herein. In various examples, a network used for communication between the dynamic allocation controller 150, the laden robotic drives 106, and/or the robotic sortation devices 110 may represent a local area network (LAN) and/or a wide area network (WAN) such as the internet.

In various examples, the volume of items/packages arriving at the induct station (e.g., at robotic sortation device 104) may be pre-sorted such that packages received at a given induct station are located proximately with respect to ejection stations (e.g., eject stations 130) that are allocated to the target destination of such pre-sorted packages.

Figure 2:
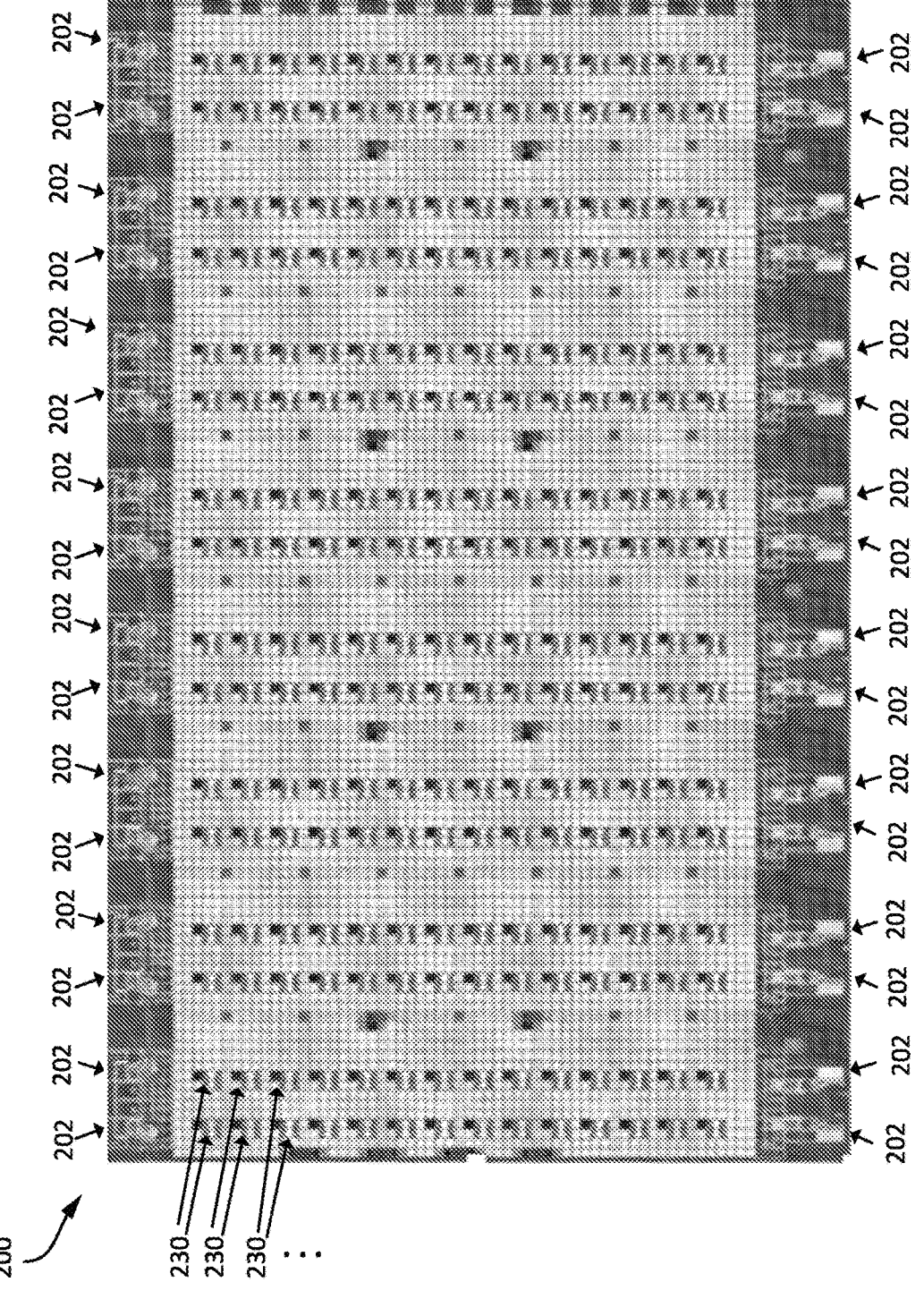
FIG. 2 is an overhead view of an example sortation field, in accordance with various aspects of the present disclosure.

FIG. 2 is an overhead view of an example sortation field 200, in accordance with various aspects of the present disclosure. The example sortation field 200 represents the mezzanine shown in FIG. 1, with a plurality of induct stations 202 along the perimeter of the mezzanine and a plurality of eject stations 230 on the interior of the mezzanine. The laden robotic drives 106 take individual packages from a given induct station 202 to a particular eject station 230 that is allocated to the target destination associated with the package. The dynamic allocation controller 150 allocates target destinations to robotic sortation devices 110 (at the bottom of the eject station 230 slide). As shown in the example sortation field 200, the number of induct and eject stations in a sortation facility can be quite large. Accordingly, dynamic allocation of robotic resources based on current package load is a challenging technical problem.

Figure 3:
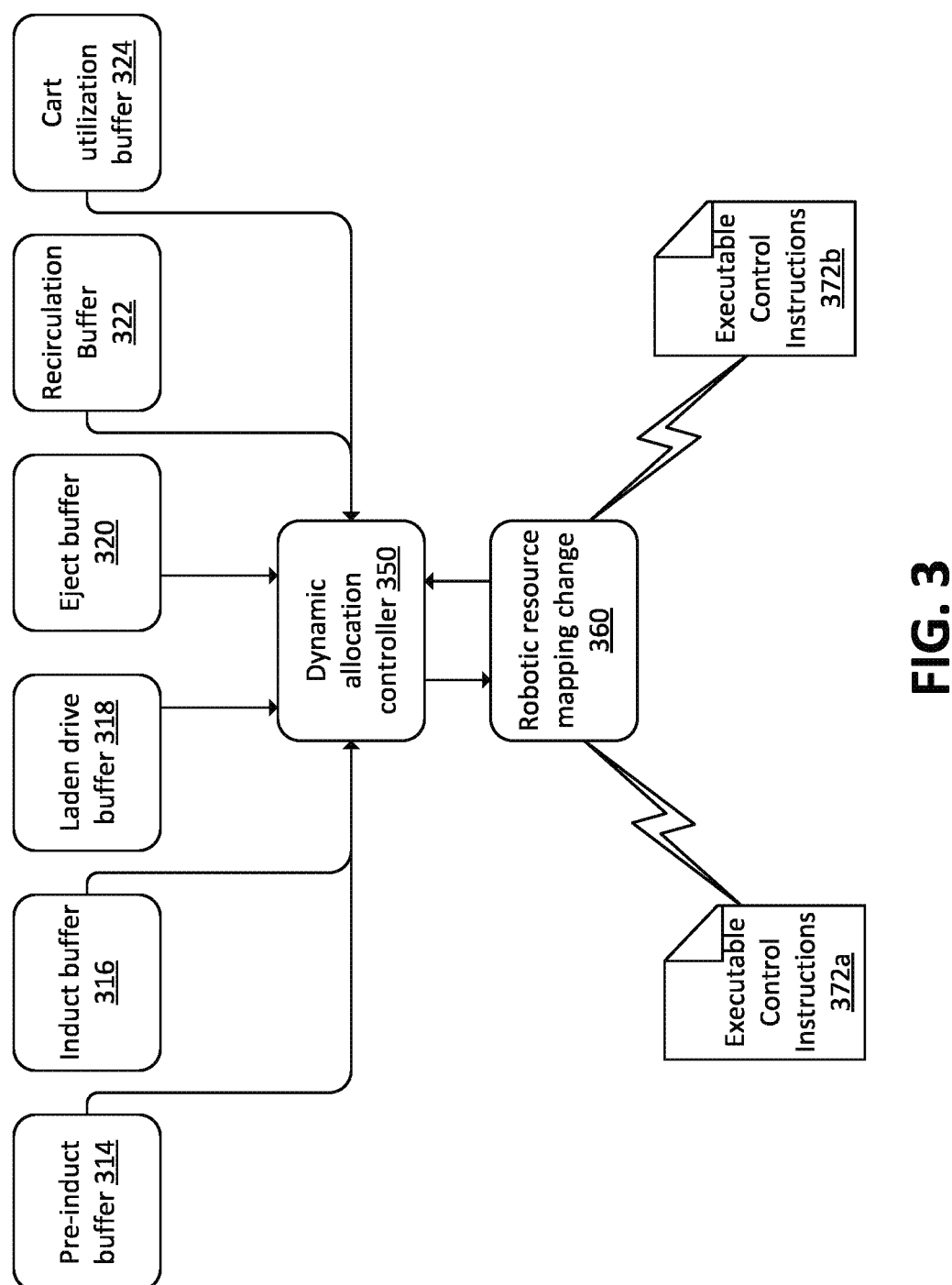
FIG. 3 is a block diagram illustrating examples inputs and outputs of the dynamic allocation controller described herein, in accordance with various aspects of the present disclosure.

FIG. 3 is a block diagram illustrating examples inputs and outputs of the dynamic allocation controller described herein, in accordance with various aspects of the present disclosure. As described above, the dynamic allocation controller 350 uses a set of state variables from various buffers to dynamically re-map robotic resources. Re-mapping refers to allocating one or more robotic resources (as well as the storage units filled by the robotic sortation devices) to a target destination. Re-mapping includes allocation, where a new/different target destination is associated with a robotic resource, and de-allocation, where a currently mapped target destination is removed from a robotic resource.

The dynamic allocation controller 350 can trigger robotic resource remappings based on a wide range of criteria, including risk of overflow of the recirculation buffer 322, cart utilization (as determined using cart utilization buffer 324), and/or various time-based deadlines (e.g., delivery deadlines and/or shipping deadlines). Data representing the various buffer levels (e.g., per-target destination package counts (for buffers that are downstream of package labeling) and/or destination-agnostic package counts (for a pre-induct buffer 314 that may be upstream of package labeling) are monitored by the dynamic allocation controller 350. The dynamic allocation controller 350 determines when and whether to remap resources (e.g., robotic resource mapping change 360) and sends on executable control instructions (e.g., executable control instructions 372a, 372b) to different robotic resources (e.g., laden robotic drives 106, robotic sortation devices 110, etc.) to allocate/de-allocate target destinations to/from these robotic resources. Upon associating a robotic sortation device 110 with a target destination (e.g., target destination A), laden robotic drives 106 are controlled via executable control instructions (e.g., executable control instructions 372a) to take packages associated with target destination A to the eject station 130 of the robotic sortation device 110 that is now mapped to target destination A. Similarly, robotic sortation device 110 detects packages that are bound for target destination A (using scanning/computer vision) and is controlled (e.g., by executable control instructions 372b) to build a destination pure container with only packages bound for the target destination A. As there may be containers at the container build station associated with the robotic sortation device 110 that are destination pure for other target destinations, the remapping causes the robotic sortation device 110 to detect the target destination for a package and to place that package in the particular storage unit (e.g., storage unit 112a) that has been designated to that particular target destination. In the example of FIG. 3, the different buffer levels that may be monitored by the dynamic allocation controller 150 include pre-induct buffer 314 (this may be multiple different buffers that are prior to the induct stations 202 (FIG. 2) and the induct buffer 316. Some of these buffers may be prior to labeling packages. In some cases, the further upstream these buffers are the more noisy the signal may be in terms of data accuracy. The dynamic allocation controller 150 may monitor the induct buffer 316, the laden drive buffer 318, the eject buffer 320, the recirculation buffer 322, and/or the cart utilization buffer 324. These buffers are described above. Different buffers and buffer levels may exist and be monitored according to the particular implementation of the sortation facility.

The dynamic allocation controller 150 may operate in a reactive mode that is focused on managing the recirculation risk (e.g., managing the risk of the recirculation buffer 322 overflowing). In such examples, the remap triggers are based on the current volume of the recirculation buffer. The monitored volume of the recirculation buffer 322 may be non-target destination specific. Additionally, the dynamic allocation controller 150 may operate in a predictive mode that considers multiple buffer levels in order to trigger robotic resource remaps.

Example Dynamic Robotic Resource Remap Logic

Let S be the set of static resources and D the set of dynamic robotic resources. The term "trigger" refers to an event that prompts the system to change the robotic resource mappings in the set S remain unchanged. Triggers correspond to a specific target destination.

Two decision-making steps are described below that determine when to trigger a remap and how to select the appropriate robotic resources once a trigger is determined. The key objectives for dynamically allocating robotic resources may be to meet target throughput, minimize package recirculation, and maximize container/cart (e.g., storage unit) gross cart utilization (GCU).

1 Notation

Given the destination d, define:

$$B_p^d = \text{pre-induct buffer package count}$$

-continued $$B_s^d = \text{induct buffer package count}$$

$$B_l^d = \text{laden drive buffer package count}$$

$$B_e^{dr} = \text{eject station buffer package count for robotic resource } r$$

$$B_c^{dr} = \text{cart } GCU \text{ buffer for robotic resource } r$$

$$B_r^d = \text{recirculation buffer package count}$$

$$L_p = \text{lead time from pre-induct buffer to eject station buffer}$$

$$L_s = \text{lead time from induct buffer to eject station buffer}$$

$$L_l = \text{lead time from laden drive buffer to eject station buffer}$$

$$L_r = \text{lead time from recirculation buffer to eject station buffer}$$

$$T_r = \text{recirculation package count threshold (threshold item count)}$$

$$T_c = \text{cart } GCU \text{ threshold}$$

$$M_d \subseteq (S \cup D) = \text{subset of robotic resources mapped to destination } d.$$

$$P_d = \{r \in M_d \cap D : B_c^{dr} \geq T_c\} =$$

dynamic robotic resources with carts (storage units 112a, 112b, 112c) full enough to deallocate $$A \subseteq D =$$

subset of dynamic robotic resources not mapped to any destination.

$$\tau_d = \text{resource-level processing rate allocated to destination } d.$$

2 Dynamic Resource Selection

The default goal of robotic resource selection is to maximize the spatial distance (e.g., in FIG. 2) between robotic resources mapped to the same destination. This helps minimize mission times and laden drive congestion.

Resource Selection for Allocation: Assume the system has determined a trigger to allocate a dynamic robotic resource to destination d. The remap fails if A=Ø (e.g., there are no unallocated robotic sortation devices). For each a∈ A, find the distance between a and the closest element in M_d. Select the a∈ A, that maximizes this distance. This policy selects the robotic resource that is farthest from other resources mapped to d.

Robotic resource Selection for Deallocation: Assume the system has determined a trigger to deallocate a dynamic robotic resource for destination d. The remap fails if P_d=Ø. For each p∈ P_d, compute the minimum distance between all pairs of resources in M_d\p. Select the resource p that maximizes this distance. This policy removes the robotic resource that was closest to other resources mapped to d.

3 Reactive Triggers

The goal of reactive triggering is to provide a temporary release valve (e.g., surge protection) when a surging target destination begins accumulating packages in the recirculation buffer 322.

Allocation Trigger: For each target destination d, this trigger monitors the recirculation buffer 322 to test whether $$B_r^d > T_r.$$

When the recirculation buffer level exceeds a threshold level, a robotic resource (e.g., a robotic sortation device) is allocated to the target destination d.

Deallocation Trigger: For each destination d, this trigger monitors the recirculation buffer 322 to test whether $$B_r^d \le T_r.$$

Note that the subsequent step (resource selection) will fail if no carts are full enough. When the recirculation buffer is less than or equal to the threshold level, a robotic resource (e.g., a robotic sortation device) is de-allocated from the target destination d.

4 Analytic Predictive Triggers

The goal of predictive triggering is to provide a temporary release valve (e.g., surge protection) before a surging target destination begins accumulating packages in the recirculation buffer 322. This section describes an example analytical approach to predictive triggering.

Allocation Trigger: The trigger tests whether the mapped resources ($M_d$) have enough processing capability to handle packages in each of the buffers in FIG. 3. This policy tests for recirculation risk due to each buffer alone and in aggregate.

$$B_x^d - |M_d| \tau_d L_x > T_r \quad x \in \{p, s, l, r\} \tag{1.}$$

$$B_p^d + B_s^d + B_l^d + B_r^d + \sum_\tau B_r^d - |M_d| \tau_d \max_{x \in \{p,s,l,r\}} \{L_x\} > T_r \tag{2.}$$

5 Predictive Trigger Extensions

The analytic approach to predictive triggering improves over reactive triggering but may use multiple approximations. For example, the handling of lead times assumes batch delivery at the eject station, and the handling of processing rate does not model resource contention. In some examples, these issues may be addressed using probabilistic analysis along with more detailed accounting of package flow. Alternatively, predictive triggering could use machine learning techniques (e.g., reinforcement learning, supervised learning, etc.) or simulation optimization to relate buffer sizes to recirculation risk.

6 Static Map

This section describes how to map the static resources S.

Let $D$ be the set of destinations.

Let $\tau$ be the station capacity.

Let $p_d$ be the PPH expected for destination d.

Let $x_{ds}=1$ if destination d is assigned to station s; $x_{ds}=0$ otherwise.

Let $n_d$ be the number of times we duplicate destination d.

Let $Q_i$ be the quadrants on the sortation field.

Let $H_i$ be the halves of the sortation field.

Let M be the eject stations in the middle of the sortation field.

Let $c_s$ be 4 for Cardinal and 1 for ACC

Let $F = \{d : n_d \ge 4\}$; $T = \{d : 2 \le n_d \le 3\}$; $O = \{d : n_d = 1\}$ $$\max_{s.t.} z$$

$$\sum_{s \in S} x_{ds} = n_d \quad \forall d \in D$$

$$\sum_{d \in D} \frac{p_d}{n_d} x_{ds} \le \tau \quad \forall s \in S$$

$$\sum_{d \in D} \frac{p_d}{n_d} x_{ds} \ge z \quad \forall s \in S$$

$$\sum_{d \in D} x_{ds} \quad \forall s \in S$$

-continued $$\sum_{s \in Q_i} x_{ds} \quad \forall d \in F; i = 1, 2, 3, 4$$

$$\sum_{s \in H_i} x_{ds} \quad \forall d \in T; \forall i = 1, 2$$

$$\sum_{s \in M} x_{ds} \quad \forall d \in 0$$

$$x_{ds} \in \{0, 1\} \quad \forall d \in D; \forall s \in S$$

The first constraint assigns d to $n_d$ robotic resources. The second constraint enforces max rate of resource. The third constraint is combined with objective function load balances. The fourth constraint enforces destination count per resource. The fifth constraint spreads highly duplicated destinations. The sixth constraint spreads mid duplicated destinations. The seventh constraint centralizes unduplicated destinations. Note the last three constraints support the resource selection goal of maximizing the distance between resources mapped to the same destination.

In various examples, instead of dynamically allocating robotic resources and controlling the robotic resources using an optimization problem, a machine learning model (e.g., a neural network and/or reinforcement learning model) may be trained to predictively allocate robotic resources based on current buffer levels. The various buffer levels may be input into the machine learning model at a given time (including, for example, per-target destination information). The machine learning model may be trained to determine whether another robotic sortation device is to be allocated for a particular target destination and/or where to allocate the robotic sortation device within the sortation facility. Control instructions may be sent to the robotic sortation device to cause the robotic sortation device to sort packages for the newly-allocated target destination into a destination pure container.

Figure 4A:
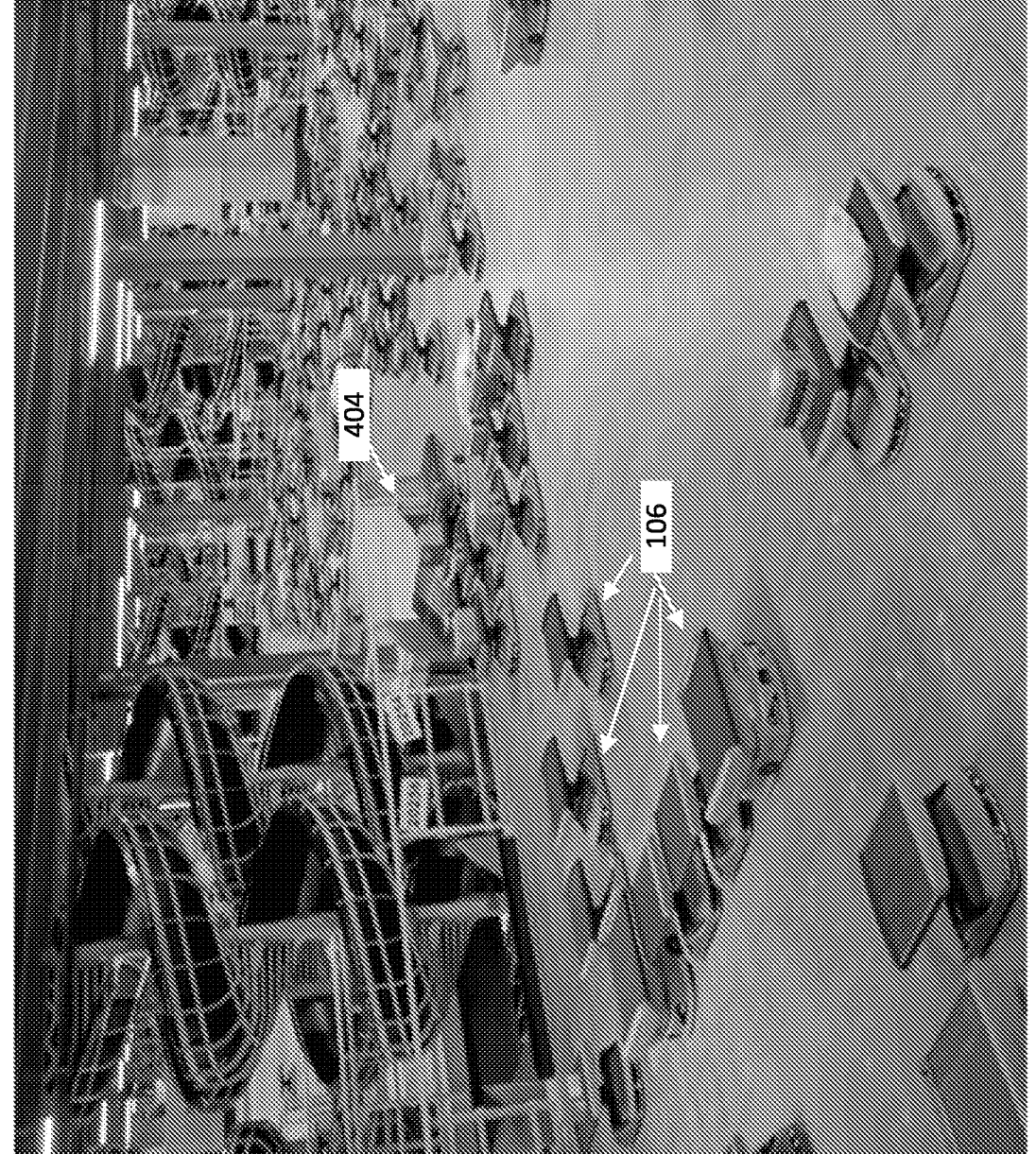
FIG. 4A is an example image depicting laden robotic drives within a sortation facility, in accordance with various aspects of the present disclosure.

FIG. 4A is an example image depicting laden robotic drives 106 within a sortation facility, in accordance with various aspects of the present disclosure. In various examples, the sortation facility depicted in FIG. 4A may be a different type of sortation facility relative to the example sortation facility depicted in FIG. 1. For example, the sortation facility depicted in FIG. 4A may have more than two floors including the floor on which the laden robotic drives 106 take individual packages to eject stations 404 (that are associated with the target destination for such packages). Accordingly, the chutes associated with the eject stations 130/404 may also be mapped to a target destination and/or set of destinations by the dynamic allocation controller 150, as described herein.

An eject station 404 is shown in FIG. 4A, for illustrative purposes. When a particular laden robotic drive 106 is loaded with a package with a known target destination, the laden robotic drive 106 may be controlled to proceed to an eject station 404 that is associated with a robotic sortation device that has been allocated to sort packages bound for the target destination into a destination pure container.

Figure 4B:
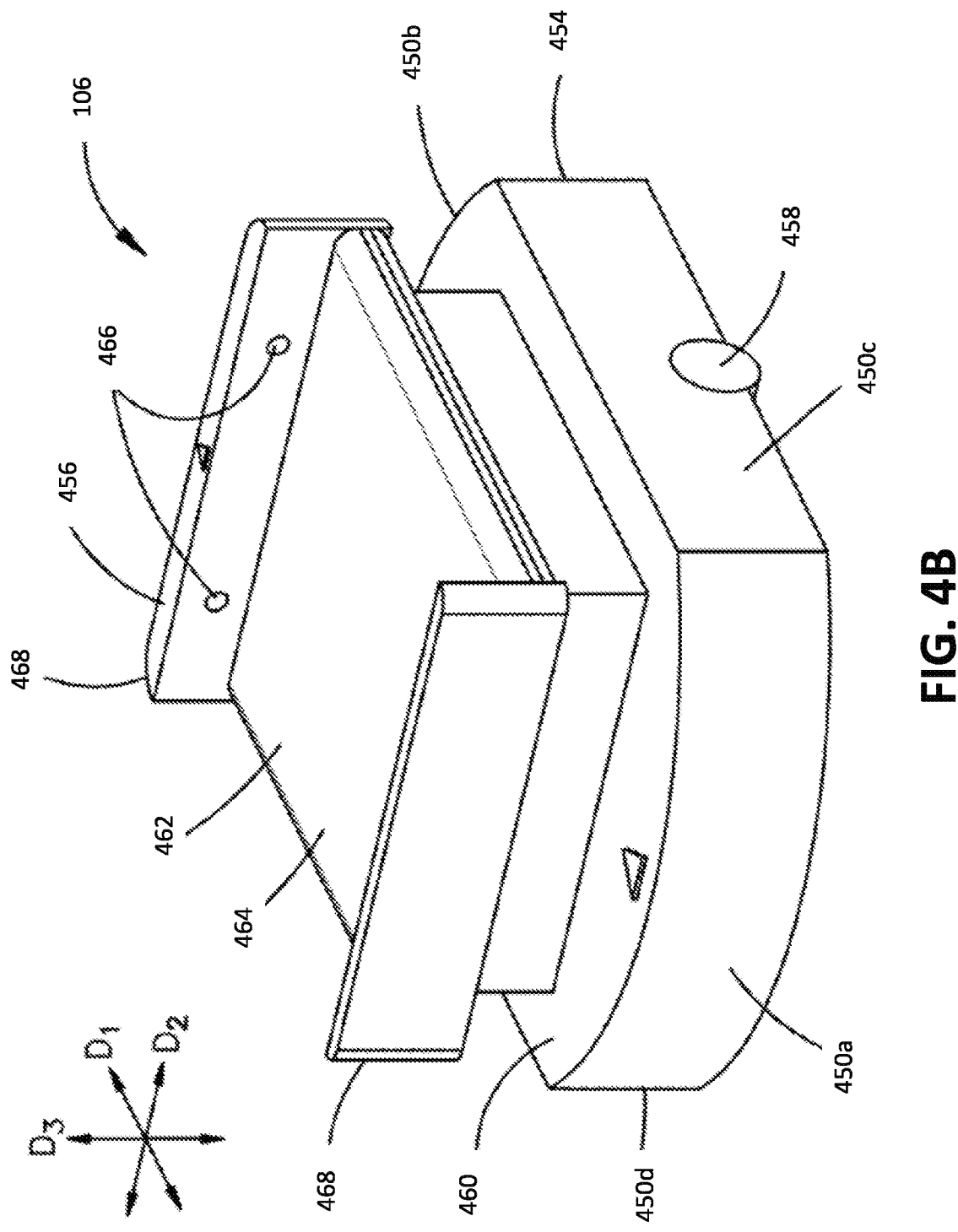
FIG. 4B is an example image of one of the laden robotic drives of FIG. 4A, in accordance with an example aspect of the present disclosure.

FIG. 4B is an example image of one of the laden robotic drives of FIG. 4A, in accordance with an example aspect of the present disclosure. Each laden robotic drive 106 may be mobile drive unit which may be an autonomous or semi-autonomous robot that travels on a floor of the warehouse guided by, for example, fiducial markers in or on the floor. In this manner, laden robotic drives 106 may follow a grid-like pattern to traverse from a starting point to a destination point, such as a drop-off location for a package. Each laden robotic drive 106 can include a first end 450a and a second end 450b that are spaced from one another along a first direction D1. Each laden robotic drive 106 can include a first side 450c and a second side 450d that are spaced from one another along a second direction D2, which is perpendicular to the first direction D1. Each laden robotic drive 106 can include and upper end and a lower end that are spaced from one another along a third direction D3, which is perpendicular to the first direction D1 and the second direction D2. The third direction D3 can be a vertical direction.

Each laden robotic drive 106 includes a vehicle chassis 454. Each chassis 454 supports a payload carrier 456 that is configured to carry a package (or other payload) thereon. The chassis 454 includes at least one pair of wheels 458. Each mobile drive unit 452 can include a motor (not shown) that is configured to drive at least one of the wheels 458 in response to control signals so as to rotate the at least one of the wheels 458, thereby causing the mobile drive unit 450 to move along a floor. The wheels 458 can be driven at the same speed as one another so as to move the mobile drive unit 450 forward or backward along the first direction D1. The speed and/or direction of at least one of the wheels 458 can be varied from that of the other wheel or wheels 458 so as to cause the mobile drive unit 450 to rotate in place or turn. Optionally, the chassis 454 can also include one or more casters (not shown) that are configured to contact the floor under the mobile drive unit 452.

The wheels 458 of each pair can be spaced opposite from one another along the second direction D2, such as at opposite sides 452c and 452d of the chassis 454, or can be disposed at any other suitable location of the chassis 454. In one example as shown, the chassis 454 can include a single pair of wheels 458 that are at approximately a midpoint of the mobile drive unit 452 between the first and second ends 452a and 452b with respect to the first direction D1. Each mobile drive unit 452 can include a cover 460 that is affixed to the chassis 454. The cover 460 can have cut-out portions that form wheel cut-outs for the wheels 458 to extend through.

The payload carrier 456 of each mobile drive unit 452 can include a conveyor system 462. The conveyor system 462 can include a conveyor surface 464 that can be defined by at least one such as a plurality of rotating conveyor elements. The rotating conveyor elements can include a conveyor belt, wire mesh, one or more rollers or balls, any other suitable rotating conveyor element, or any suitable combination of rotating conveyor elements. The conveyor surface 464 can be configured to rotate relative to the chassis 454 so as to move payloads supported thereon along the second direction D2. However, it will be understood that in alternative embodiments, the conveyor surface 464 can be configured to move payloads along the first direction D1.

The conveyor system 462 can include one or more sensors 466, such as (without limitation) photo-eyes or light curtains, that are configured to detect the presence and/or location of payloads on conveyor surface 464. The number of sensors 466 can be selected based on variability of the speed of the mobile drive units. Rotation of the conveyor elements can be controlled based on the whether or not a payload is detected on the conveyor surface 464. For example, rotation of the conveyor elements can be stopped when the one or more sensors 466 detect that a payload has been received on the conveyor surface 464. The laden robotic drive 106 can further rotate the conveyor surface 464 so as to reposition the payload on the conveyor surface 464 in the event that the sensors 466 detect that the payload is hanging off of the conveyor surface 464. Optionally, the conveyor system 462 can include sidewalls 468 that extend vertically upwards relative to the conveyor surface 464 so as to prevent payloads (e.g., packages) from falling off the ends 452a and 452b of the mobile drive unit 452 during transport.

Figure 4C:
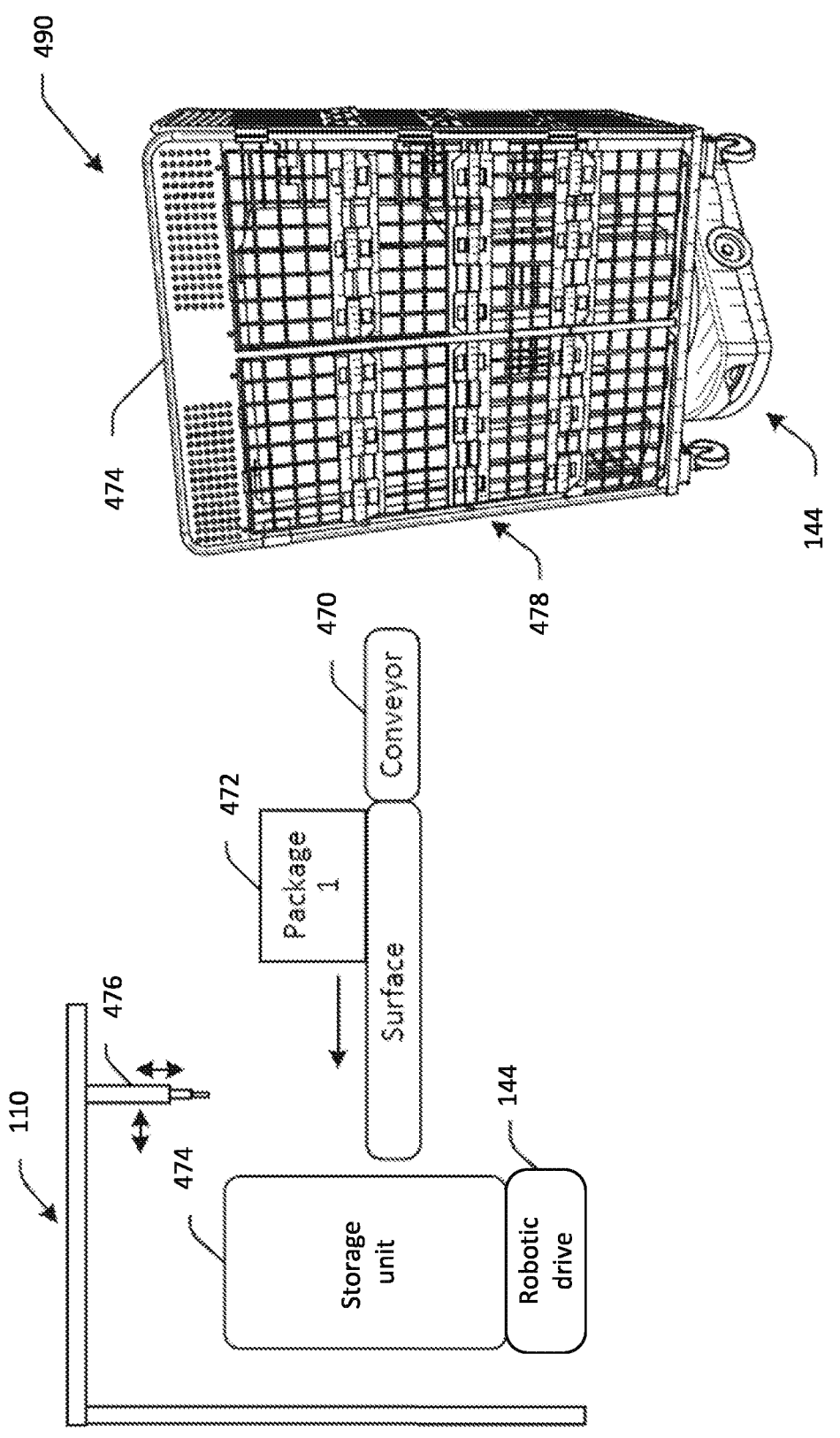
FIG. 4C is a diagram of a robotic sortation device that sorts items into target containers, in accordance with various embodiments described herein.

FIG. 4C is a diagram of a robotic sortation device 110 that sorts items into target containers such as mobile storage units (e.g., carts), in accordance with various embodiments described herein. In FIG. 4C, a conveyor 470 may be used to transport packages 472. The packages 472 may be diverted onto one or more surfaces to await placement into different corresponding containers (e.g., moveable storage unit 474). In some instances, the conveyor 470 may be elevated with respect to the storage units 474. The packages 472 may be diverted using arms or bars that are automatically controlled.

As depicted in a side view, the robotic sortation device 110 may be positioned adjacent to the first storage unit 474. The robotic sortation device 110 may include a robotic manipulator 476 that is configured to grasp packages from the corresponding surface and to move the package into the first storage unit 474. The robotic manipulator 476 may include a linear actuator and/or telescoping arm with an end of arm tool that is used to grasp packages of different shapes, sizes, weights, and so forth. In other examples, the robotic manipulator 476 may instead by at the end of a hinged crane-like arm that may be controlled to grasp packages and place the packages into a destination pure container for which the robotic sortation device has been allocated in accordance with the various techniques described herein. The robotic manipulator 476 may have three degrees of freedom. For example, the robotic manipulator 476 may be configured to move the X-, Y-, and Z-axis directions. In some examples, the robotic manipulator 476 may not be able to rotate along a central axis of the actuator or telescoping arm, so as to simplify hardware. The robotic manipulator 476 may be coupled to a support that is coupled to a floor of the facility, or a support that is coupled to a moveable base, or to another type of support. If the robotic manipulator 476 is coupled to a moveable support instead of a permanent fixture, the robotic manipulator 476 may be used to service different moveable carts by repositioning the robotic manipulator 476. The robotic manipulator 476 may be configured to access the first storage unit 474 from a topside, or from above, without requiring the doors of the first cart to be opened, thereby further simplifying the loading process.

The robotic sortation device 110 may include a robotic drive 144 disposed at least partially under the first storage unit 474. The robotic drives 144 may be part of an autonomous robot. The robotic drives 144 may be configured to rotate the first storage unit 474 in different directions. Because the robotic drives 144 can rotate the first storage unit 474, rotational ability may not be needed at the robotic manipulator 476. However, in other examples, the robotic sortation device may rotate 360 degrees to place packages into different storage units at the container build station. The robotic drives 144 may be disposed under an individual container. Different robotic platforms may be used for different containers.

As depicted in isolated view 490, the first storage unit 474 may have doors 478 that can open by swinging outwards. Because the robotic manipulator 476 can access the first storage unit 474 from above or from a topside, the doors 478 can remain closed during loading. The robotic manipulator 476 may be a moveable robotic manipulator that can be moveably positioned adjacent to different carts. As previously described, the robotic sortation device 110 may be positioned at a container build station. There may be designated positions for robotic drives 144 to bring storage units 474 to the container build station. Each storage unit 474 may be designated to a target destination for which the robotic sortation device 110 has been allocated using the various techniques described herein. Accordingly, the robotic sortation device 110 may place packages bound for a particular target destination into the mobile storage unit that is associated with that target destination. When the storage unit is full (e.g., above a threshold cart utilization), the robotic drive 144 may remove the storage unit and a different robotic drive 144 may bring an empty storage unit for further container build operation.

The robotic sortation device 110 may be in communication with one or more sensors, such as cameras, used to capture images of the contents of the first storage unit 474 and/or to determine the target destination for a particular package. The image data may be used to determine positioning for a package and/or to scan labels of the package to identify the target destination for a package so that the robotic sortation device may place the package into a destination pure container for which the robotic sortation device has been allocated. The package may be positioned in the predetermined position via movement of the robotic manipulator 476 after the package is grasped. Additionally, sensors such as the one or more cameras may monitor the storage units "fullness" to determine the cart utilization (which may be stored in a cart utilization buffer by the dynamic allocation controller 150).

The robotic sortation device 110 may include an autonomous robot controlling the robotic arm. The robotic drive 144 may be configured to rotate storage units (e.g., carts) from a first orientation to a second orientation. The robotic drive 144 may be configured to rotate carts at least 180 degrees. The robotic sortation device 110 may include the robotic manipulator 476 that has a linear actuator or other actuator and an end of arm tool. The robotic manipulator may be configured to (i) retrieve a first package from a first surface and to position the first package inside the first cart at a first predetermined position without opening the first door, and (ii) retrieve a second package from a second surface and to position the second package inside the second cart at a second predetermined position without opening the second door. The robotic manipulator 476 accesses the carts from a top side. The robotic sortation device 110 may include or may be in communication with, a first camera configured to image an interior of the first cart, and a second camera configured to image an interior of the second cart.

Figure 4D:
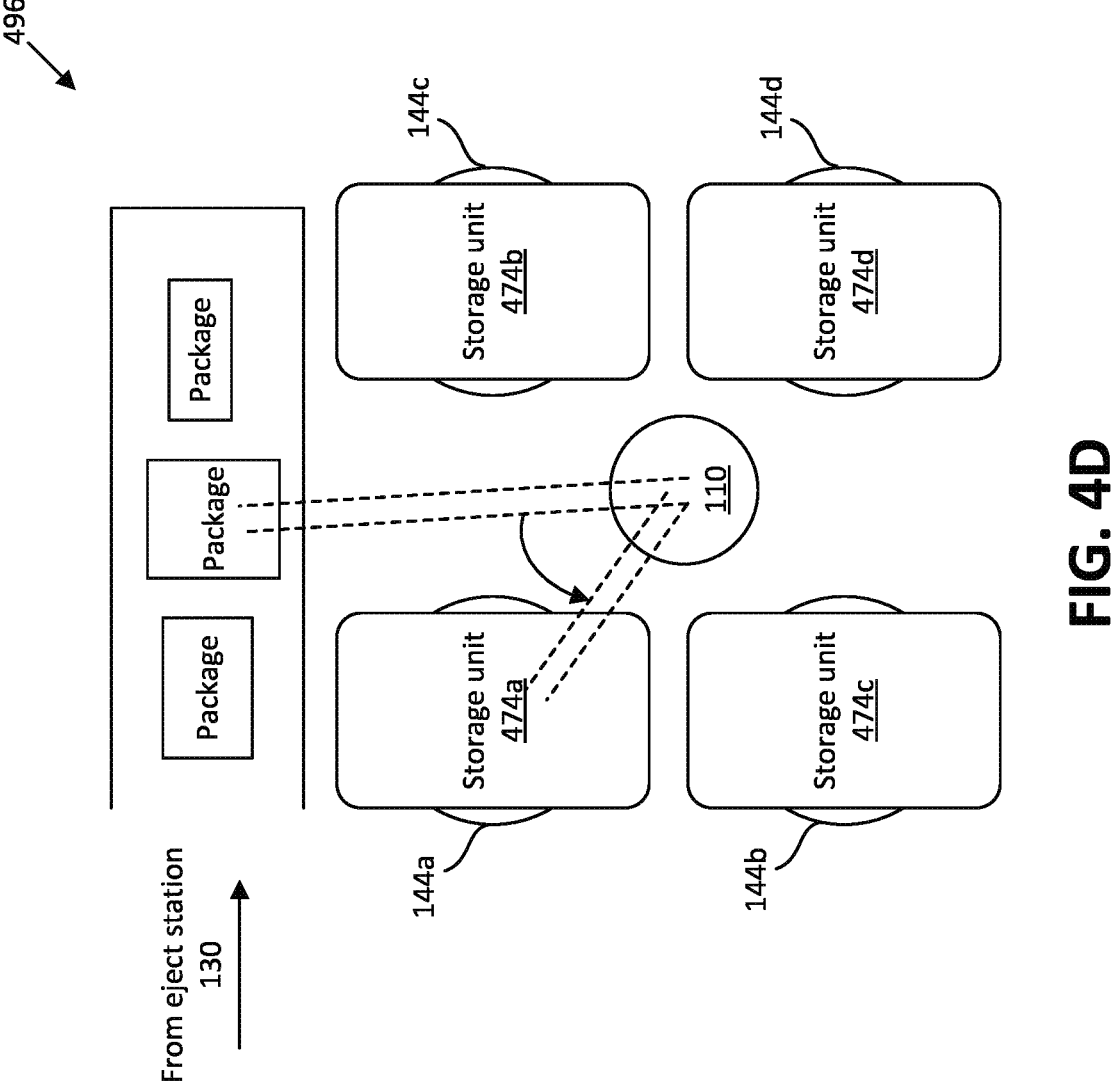
FIG. 4D depicts an overhead example of a container build station in accordance with various examples of the present disclosure.

FIG. 4D depicts an overhead example of a container build station in accordance with various examples of the present disclosure. In the example of FIG. 4D, packages arrive from the eject station 130 at the container build station 496. In various examples, laden drives 106 may bring a particular package to the eject station 130 and container build station 496 that has been allocated to the target destination of the package by the dynamic allocation controller 150. The laden drives 106 may receive instructions from the dynamic allocation controller 150 and/or from another controller instructing a target eject station 130 to which to take a given package based on the target destination for the loaded package and the current allocation of eject stations 130/robotic sortation devices 110 by the dynamic allocation controller 150.

In the example of FIG. 4D there may be four positions (e.g., docking positions) for four storage units (e.g., storage units 474a, 474b, 474c, and 474d). This number may vary according to the implementation and/or physical space constraints. In this example, the robotic sortation device 110 may be allocated by dynamic allocation controller 150 to up to four different target destinations. For example, each of the four storage units 474a, 474b, 474c, and 474d may be allocated to different target destinations or two or more of the four storage units 474a, 474b, 474c, and 474d may be allocated to the same target destination.

When a package is received from the eject station 130, the sensors at the container build station 496 may determine the target destination for the package and may send control instructions to the robotic sortation device 110 to instruct the robotic sortation device 110 to place the package into the storage unit that corresponds to the target destination. In another example embodiment, the laden robotic drive 106 that brings the package to the eject station 130 and to the container build station 496 may transmit the target destination of the package to the robotic sortation device 110. Accordingly, the robotic sortation device 110 may grasp the package and place the package into the storage unit (e.g., storage unit 474a) that corresponds to the target destination. Since each storage unit 474a, 474b, 474c, 474d is associated with a target destination, the robotic sortation device 110 may build destination pure containers in which each package placed into a given storage unit is associated with the same target destination. Once the cart utilization buffer 124 includes cart utilization data indicating that a storage unit has reached a desired level of fullness (e.g., a threshold cart utilization), the robotic drive (e.g., robotic drive 144a, 144b, 144c, 144d) may remove the storage unit from the container build station 496 and an empty storage unit may be brought to the container build station 496 by a different robotic drive 144 (or by the same drive). The dynamic allocation controller 150 may allocate the empty cart (and the robotic sortation device) to be associated with a new, different target destination, depending on the current buffer levels and/or on the reactive or predictive mode of the dynamic allocation controller 150, as described above.

Figure 5:
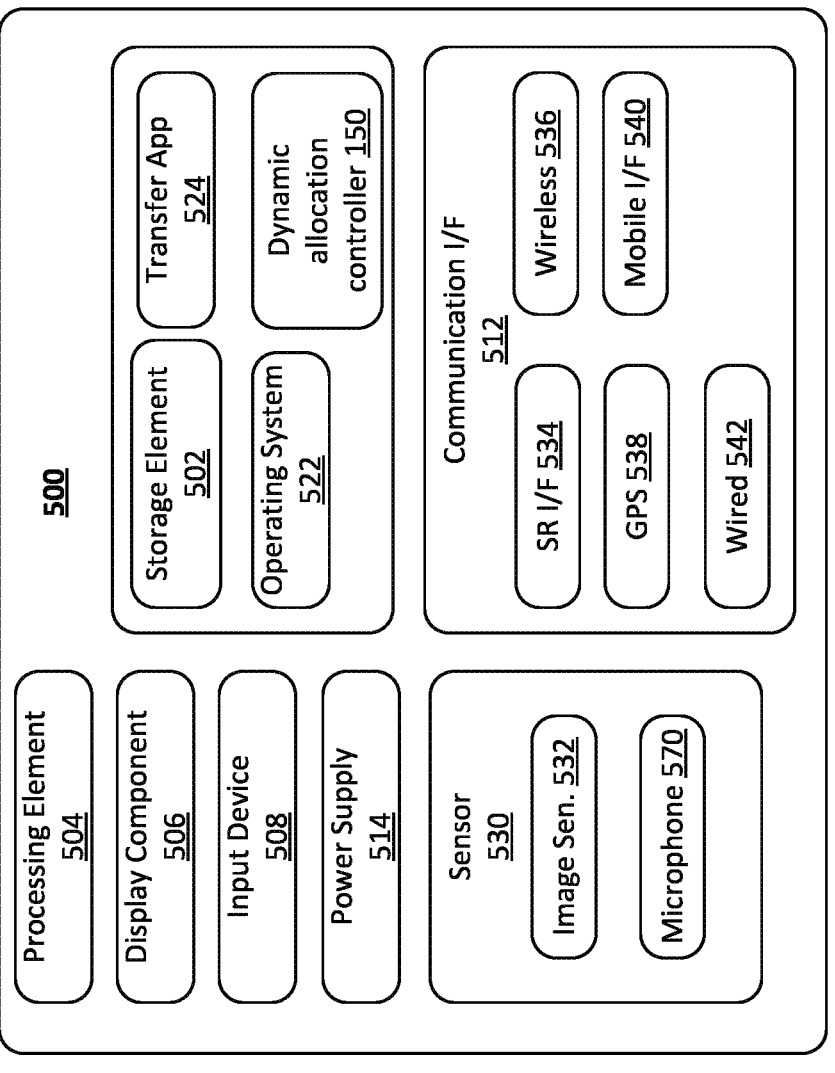
FIG. 5 is an example computing device architecture that may be used in accordance with various techniques described herein.

FIG. 5 is a block diagram showing an example architecture 500 of a computing device that may be used in accordance with various aspects of the present disclosure. For example, the dynamic allocation controller 150 may comprise one or more components of the architecture 500 (or the architecture 500 may include the dynamic allocation controller 150, as shown). It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store computer-executable instructions configured to implement the dynamic allocation controller

150 described herein. The dynamic allocation controller 150 may include and/or be configured in communication with the various buffers described above in reference to FIG. 3 and may dynamically allocate robotic resources (e.g., robotic sortation devices 110) to different target destinations based on current and/or predicted processing/sorting needs. In examples where the dynamic allocation controller 150 executes one or more machine learning models to make dynamic allocation decisions, the various model architectures and/or parameters may be stored in storage element 502.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images generated in accordance with the various techniques described herein. In various examples, the display component 506 may be a wearable display (e.g., in a headset, goggles, and/or glasses) that may display the various graphical highlight data, graphical navigational hints, text, other graphical data, etc., described herein. In some examples, the architecture 500 may include one or more speakers effective to output audio.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In various examples, the image sensor 532 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 6:
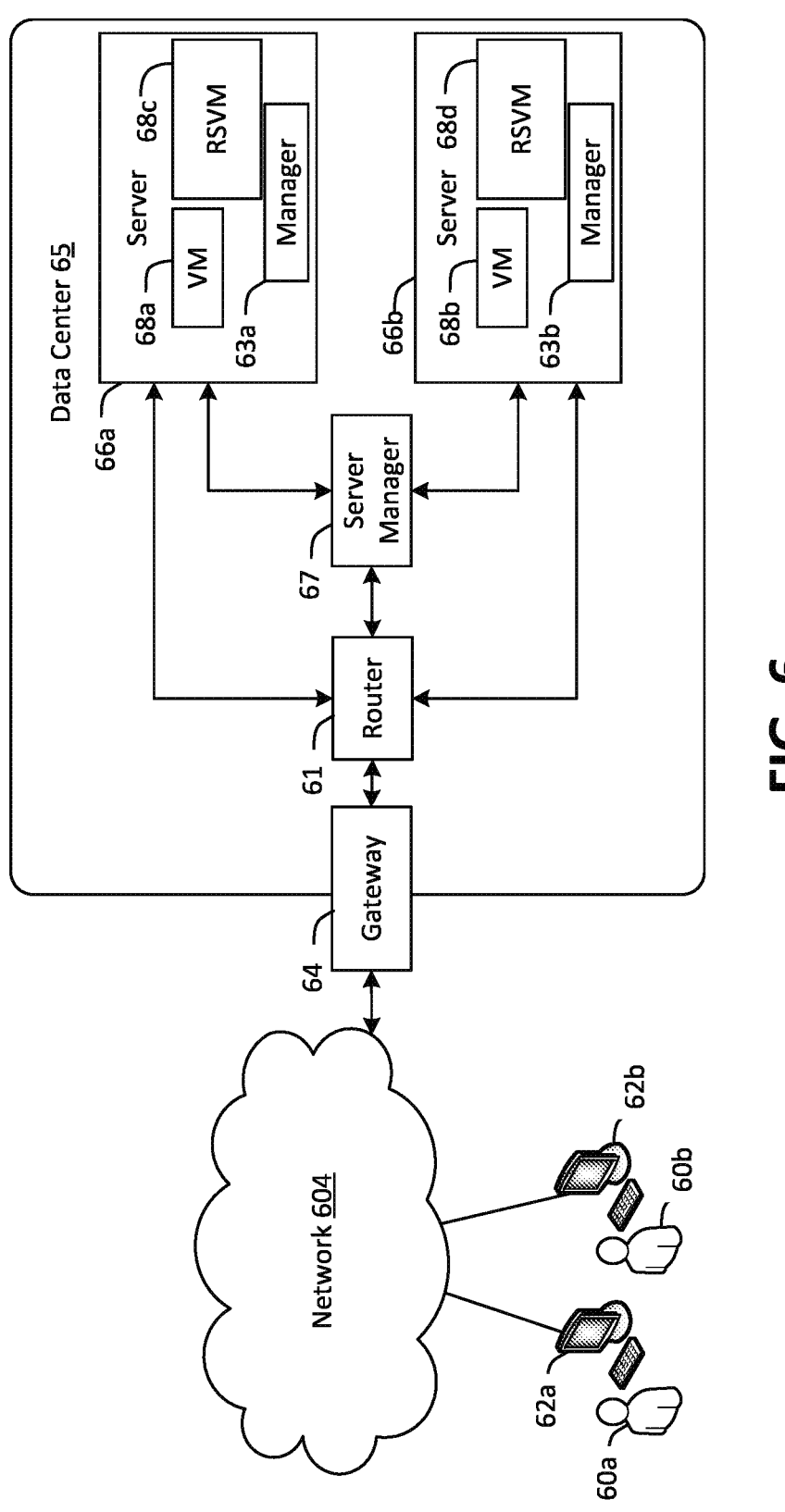
FIG. 6 is a diagram illustrating an example system for sending and providing data that may be used in accordance with the present disclosure.

An example system for sending and providing data that may be used to perform one or more of the various techniques described herein will now be described in detail. In particular, FIG. 6 illustrates an example computing environment in which the embodiments described herein may be implemented. For example, the computing environment of FIG. 6 may be configured to dynamically allocate robotic resources as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via a computer communication network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

FIG. 7 is a flowchart describing an example process 700 for dynamic allocation of robotic sortation resources, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a first item associated with a first target may be determined. For example, a first package may be associated (e.g., labeled) with a target destination.

Processing may continue at action 720, at which a first item count associated with a first buffer may be determined. The first buffer may store items prior to loading the items onto robotic drives. For example, the first buffer may be the induct buffer 316 that may store packages prior to loading the packages onto laden robotic drives 106. The first item count may be sent to or otherwise available to the dynamic allocation controller 150.

Processing may continue at action 730, at which a second item count associated with items loaded onto robotic drives may be determined. For example, at action 730, the number of packages in the laden drive buffer 318 may be determined. In various examples, per-destination package counts in the laden drive buffer 318 may be determined. The second item count may be sent to or otherwise available to the dynamic allocation controller 150.

Processing may continue at action 740, at which a first number of robotic sortation devices allocated to the first target may be determined. For example, the dynamic allocation controller 150 may determine the number of robotic sortation devices 110 that are currently allocated to the first target destination (e.g., the target destination of the first item determined at action 710).

Processing may continue at action 750, at which an additional robotic sortation device may be allocated to the first target based on the first item count, the second item count, and the first number of robotic sortation devices allocated to the first target. For example, the dynamic allocation controller 150 may be operating in a predictive mode. Accordingly, the dynamic allocation controller 150 may determine, using the various buffer levels (as described above in reference to FIG. 3), including the levels of the induct buffer 316 and the laden drive buffer 318, that an additional robotic sortation device 110 should be allocated to the first target destination based on the current and/or predicted load. In various examples, the additional robotic sortation device may be spatially allocated as described above in the section entitled Dynamic Resource Selection to maximize the spatial distance between robotic resources mapped to the same target destination.

Processing may continue at action 760, at which the first item may be loaded onto a first robotic drive. For example, the first item may be loaded onto a laden robotic drive 106. Processing may continue at action 770, at which first control instructions may be sent to the first robotic drive to cause the first robotic drive to take the first item to the additional robotic sortation device. For example, control instructions may be sent to the laden robotic drive 106 to take the package (e.g., the first item) to the newly-allocated robotic sortation device 110 (which may be associated with a particular eject station 130 and/or container build station.

Processing may continue at action 780, at which the additional robotic sortation device may determine, using computer vision, that the first item is associated with the first target. For example, the newly-allocated robotic sortation device 110 may use and/or communicate with a camera and/or scanning device to determine that the first item is bound for the target destination (e.g., by scanning a label affixed to the first item).

Processing may continue to action 790, at which the additional robotic sortation device may be controlled (e.g., via control instructions from the dynamic allocation controller 150) to place the item into a first container (e.g., a particular storage unit) associated with the first target based on allocation of the additional robotic sortation device to the first target. For example, the robotic sortation device 110 may place the package into the storage unit (e.g., a cart) that corresponds to the target destination based on the allocation of the storage unit and the robotic sortation device 110 to the target destination.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
determining a first item associated with a first target;
determining a first item count associated with a first buffer, wherein the first buffer stores items prior to loading the items onto robotic drives;

determining a second item count associated with items loaded onto robotic drives;
determining a first number of robotic sortation devices allocated to the first target;
allocating an additional robotic sortation device to the first target based on the first item count, the second item count, and the first number of robotic sortation devices allocated to the first target;
loading the first item onto a first robotic drive;
sending first control instructions to the first robotic drive effective to cause the first robotic drive to take the first item to the additional robotic sortation device;
receiving, by the additional robotic sortation device, the first item;
determining, by the additional robotic sortation device using computer vision, that the first item is associated with the first target; and
controlling the additional robotic sortation device to place the first item in a first container associated with the first target based at least in part on the allocation of the additional robotic sortation device to the first target and based on the first item being associated with the first target.

2. The method of claim 1, further comprising:
determining a set of robotic sortation devices that are unallocated to a target;
determining, for a first robotic sortation device of the set of robotic sortation devices, a first distance between the first robotic sortation device and a second robotic sortation device allocated to the first target, wherein the second robotic sortation device is a closest robotic sortation device to the first robotic sortation device among robotic sortation devices allocated to the first target;
determining, for a third robotic sortation device of the set of robotic sortation devices, a second distance between the third robotic sortation device and a fourth robotic sortation device allocated to the first target, wherein the fourth robotic sortation device is the closest robotic sortation device to the third robotic sortation device among robotic sortation devices allocated to the first target; and
selecting the first robotic sortation device as the additional robotic sortation device to allocate to the first target based on the first distance being greater than the second distance.

3. The method of claim 1, further comprising:
determining that the first container has been removed from a station associated with the additional robotic sortation device; and
deallocating the additional robotic sortation device from the first target.

4. The method of claim 3, further comprising:
determining a first percentage utilization of the first container based at least in part on a number of items in the first container; and
determining that the first percentage utilization is greater than or equal to a threshold percentage utilization, wherein the deallocating the additional robotic sortation device from the first target is based at least in part on the first percentage utilization being greater than or equal to the threshold percentage utilization.

5. A method of controlling robotic sortation devices, comprising:
determining a first item associated with a first target;
determining a first item count associated with a first buffer;

allocating a first robotic sortation device to the first target based at least in part on the first item count;

receiving, by the first robotic sortation device, the first item; and controlling the first robotic sortation device to place the first item in a first container associated with the first target.

6. The method of claim 5, further comprising:

determining a second item count associated with items loaded onto a plurality of robotic drives, wherein the first robotic sortation device is allocated to the first target further based at least in part on the second item count.

7. The method of claim 6, further comprising:

loading the first item onto a first robotic drive of the plurality of robotic drives; and sending control instructions to the first robotic drive effective to cause the first robotic drive to navigate to the first robotic sortation device based at least in part on the allocating the first robotic sortation device to the first target.

8. The method of claim 5, wherein the first buffer comprises a recirculating buffer that stores overflow items that are currently unable to be processed by robotic sortation devices due to current processing load, the method further comprising:

comparing the first item count to a threshold item count associated with the first buffer; and allocating the first robotic sortation device to the first target based at least in part on the first item count exceeding the threshold item count.

9. The method of claim 5, further comprising:

determining a set of robotic sortation devices that are unallocated to a target;

determining, for the first robotic sortation device of the set of robotic sortation devices, a first distance between the first robotic sortation device and a second robotic sortation device allocated to the first target, wherein the second robotic sortation device is a closest robotic sortation device to the first robotic sortation device among robotic sortation devices allocated to the first target;

determining, for a third robotic sortation device of the set of robotic sortation devices, a second distance between the third robotic sortation device and a fourth robotic sortation device allocated to the first target, wherein the fourth robotic sortation device is the closest robotic sortation device to the third robotic sortation device among robotic sortation devices allocated to the first target; and selecting the first robotic sortation device to allocate to the first target based on the first distance being greater than the second distance.

10. The method of claim 5, further comprising:

determining that the first container has been removed from a station associated with the first robotic sortation device; and deallocating the first robotic sortation device from the first target.

11. The method of claim 10, further comprising:

determining a first percentage utilization of the first container based at least in part on a number of items in the first container; and determining that the first percentage utilization is greater than or equal to a threshold percentage utilization, wherein the deallocating the first robotic sortation device from the first target is based at least in part on the first percentage utilization being greater than or equal to the threshold percentage utilization.

12. The method of claim 5, further comprising:

determining a first number of items associated with the first target in the first buffer;

determining a second number of items associated with the first target in a laden drive buffer; and allocating, based on the first number and the second number, the first robotic sortation device to the first target.

13. The method of claim 12, further comprising:

inputting first data into a first machine learning model, wherein the first data comprises a representation of at least the first number and the second number;

generating, by the first machine learning model, output data indicating that an additional robotic sortation device is allocated to the first target; and sending control instructions to the first robotic sortation device, the control instructions designating the first container as associated with the first target.

14. A system comprising:

at least one processor; and non-transitory computer-readable memory storing instructions that, when executed by the at least one processor is effective to;

determine a first item associated with a first target;

determine a first item count associated with a first buffer;

allocate a first robotic sortation device to the first target based at least in part on the first item count;

receive, by the first robotic sortation device, the first item; and control the first robotic sortation device to place the first item in a first container associated with the first target.

15. The system of claim 14, the non-transitory computer-readable memory storing further instructions that, when executed by the at least one processor, are further effective to:

determine a second item count associated with items loaded onto a plurality of robotic drives, wherein the first robotic sortation device is allocated to the first target further based at least in part on the second item count.

16. The system of claim 14, the non-transitory computer-readable memory storing further instructions that, when executed by the at least one processor, are further effective to:

load the first item onto a first robotic drive of a plurality of robotic drives; and send control instructions to the first robotic drive effective to cause the first robotic drive to navigate to the first robotic sortation device based at least in part on the allocating the first robotic sortation device to the first target.

17. The system of claim 14, wherein the first buffer comprises a recirculating buffer that stores overflow items that are currently unable to be processed by robotic sortation devices due to current processing load, the non-transitory computer-readable memory storing further instructions that, when executed by the at least one processor, are further effective to:

compare the first item count to a threshold item count associated with the first buffer; and allocate the first robotic sortation device to the first target based at least in part on the first item count exceeding the threshold item count.

18. The system of claim 14, the non-transitory computer-readable memory storing further instructions that, when executed by the at least one processor, are further effective to:

determine a set of robotic sortation devices that are unallocated to a target;

determine, for the first robotic sortation device of the set of robotic sortation devices, a first distance between the first robotic sortation device and a second robotic sortation device allocated to the first target, wherein the second robotic sortation device is a closest robotic sortation device to the first robotic sortation device among robotic sortation devices allocated to the first target;

determine, for a third robotic sortation device of the set of robotic sortation devices, a second distance between the third robotic sortation device and a fourth robotic sortation device allocated to the first target, wherein the fourth robotic sortation device is the closest robotic sortation device to the third robotic sortation device among robotic sortation devices allocated to the first target; and selecting the first robotic sortation device to allocate to the first target based on the first distance being greater than the second distance.

19. The system of claim 14, the non-transitory computer-readable memory storing further instructions that, when executed by the at least one processor, are further effective to:

determine that the first container has been removed from a station associated with the first robotic sortation device; and deallocate the first robotic sortation device from the first target.

20. The system of claim 19, the non-transitory computer-readable memory storing further instructions that, when executed by the at least one processor, are further effective to:

determine a first percentage utilization of the first container based at least in part on a number of items in the first container; and determine that the first percentage utilization is greater than or equal to a threshold percentage utilization, wherein the deallocating the first robotic sortation device from the first target is based at least in part on the first percentage utilization being greater than or equal to the threshold percentage utilization.

* * * * *